US012781882B2

(12) United States Patent
Poisson

(10) Patent No.: US 12,781,882 B2
(45) Date of Patent: Nov. 3, 2026

(54) REINFORCED THERMOPLASTIC PIPES

(71) Applicant: Polyflow, LLC, Midland, TX (US)

(72) Inventor: Jean-Louis Poisson, Midland, TX (US)

(73) Assignee: Polyflow, LLC, Midland, TX (US)

( * ) Notice: Subject to any disclaimer, the term of this patent is extended or adjusted under 35 U.S.C. 154(b) by 610 days.

(21) Appl. No.: 18/069,545

(22) Filed: Dec. 21, 2022

(65) Prior Publication Data

US 2024/0209965 A1 Jun. 27, 2024

(51) Int. Cl.
*F16L 11/08* (2006.01)
*F16L 11/04* (2006.01)

(52) U.S. Cl.
CPC ......... *F16L 11/08* (2013.01); *F16L 2011/047* (2013.01)

(58) Field of Classification Search
CPC ............................ F16L 11/08; F16L 2011/047
See application file for complete search history.

(56) References Cited

U.S. PATENT DOCUMENTS 6,555,243 B2 4/2003 Flepp et al.
7,063,873 B2 6/2006 Bellet et al.
7,175,896 B2 2/2007 Schmitz et al.
10,036,491 B2 7/2018 Harris et al.
10,252,498 B2 4/2019 Berger et al.
2005/0021774 A1 1/2005 Kurihara et al.
2007/0025914 A1 2/2007 Jacks et al.
2008/0009596 A1 1/2008 Gu et al.
2011/0013978 A1 1/2011 Smith et al.
2014/0182735 A1* 7/2014 Dyksterhouse ......... F16L 9/123 156/187
2014/0246111 A1* 9/2014 Zimmer .................. F16L 9/125 138/140

(Continued)

FOREIGN PATENT DOCUMENTS

CN 105985624 B 7/2018

OTHER PUBLICATIONS

Takashige, M. and Kanai, T . . . "Multilayer Barrier Film of Biaxially Oriented PA6/EVOH by Double Bubble Tubular Film Process" International Polymer Processing, vol. 21, No. 1, 2006, pp. 86-92. https://doi.org/10.3139/217.0110.

(Continued)

*Primary Examiner* — David R Deal
(74) *Attorney, Agent, or Firm* — E. Eric Mills; Nicholas P. Stadnyk; Maynard Nexsen PC

(57) ABSTRACT

There is provided a permeation barrier layer for a reinforced thermoplastic pipe for transportation of oilfield fluids. The permeation barrier layer comprises (i) an external layer comprising a first thermoplastic polymer, (ii) an intermediate layer comprising ethylene vinyl alcohol (EVOH) copolymers, and (iii) an internal layer comprising a polyamide. At least a portion of the intermediate layer is in contact with the external layer and/or the internal layer. There is also provided a reinforced thermoplastic pipe body comprising a permeation barrier layer and at least one reinforcement layer comprising fibres or wires. There is further provided a method for producing a permeation barrier layer for a reinforced thermoplastic pipe for transportation of oilfield fluids and a method for producing a reinforced thermoplastic pipe body.

7 Claims, 1 Drawing Sheet

(56) References Cited

U.S. PATENT DOCUMENTS

2022/0019618 A1 1/2022 Dronamraju

OTHER PUBLICATIONS

Biaobing Wang, Yang Yang, Weinan Guo; "Effect of EVOH on the morphology, mechanical and barrier properties of PA6/POE-g-MAH/EVOH ternary blends," Materials & Design, vol. 40, Sep. 2012, pp. 185-189, ISSN 0261-3069, https://doi.org/10.1016/j.matdes.2012.03.017.(https://www.sciencedirect.com/science/article/pii/S0261306912001811).

* cited by examiner

REINFORCED THERMOPLASTIC PIPES

FIELD OF THE INVENTION

The present invention relates to reinforced thermoplastic pipes for transportation of oilfield fluids. The invention has a particular, but not exclusive, application to permeation barrier layers for a reinforced thermoplastic pipes. The invention also relates to a method for producing a permeation barrier layer for a reinforced thermoplastic pipe, and a method for producing a reinforced thermoplastic pipe body.

BACKGROUND

Reinforced thermoplastic pipe (RTP) may be suitable for use in the oil and gas industry for transporting and/or distributing oilfield fluids, such as water, gas (methane, ethane, CO2 etc.) and/or the transport and distribution of hydrocarbon liquids, or other fluids such as hydrogen. Ethylene vinyl alcohol (EVOH) copolymers can be utilised to aid in the transportation of a wide range of such fluids. EVOH provides a particular benefit in the transportation of hydrogen due to its low permeability relative to polymers. However, due to its hydrophilic nature and sensitivity to moisture, EVOH is not generally used individually as a low permeation barrier. EVOH can be used in a multilayer structure to reduce its exposure to moisture and prevent the increase in permeability of EVOH. For example, polyamide 12 (PA12) has been used in multilayer structures with EVOH with the addition of tie layers to enhance the bonding between EVOH and PA12. The term "tie layer", as used herein, means an adhesive that improves the adhesion between two corresponding layers. Such multilayer structures can be produced by co-extruding EVOH with PA12 and tie layers, resulting in a 5 layer co-extruded structure.

There exists challenges associated with the production of such multilayer EVOH structures. For example, complicated equipment will be required to generate the multiple layers, which can result in expensive and inefficient production of reinforced thermoplastic pipes.

SUMMARY

According to a first aspect, there is provided a permeation barrier layer for a reinforced thermoplastic pipe for transportation of oilfield fluids. The permeation barrier layer comprises (i) an external layer comprising a first thermoplastic polymer, (ii) an intermediate layer comprising ethylene vinyl alcohol (EVOH) copolymers, and (iii) an internal layer comprising a polyamide. At least a portion of the intermediate layer is in contact with the external layer and/or the internal layer.

According to a second aspect, there is provided a reinforced thermoplastic pipe body comprising a permeation barrier layer and at least one reinforcement layer comprising fibres or wires. The permeation barrier layer comprises (i) an external layer comprising a first thermoplastic polymer, (ii) an intermediate layer comprising ethylene vinyl alcohol (EVOH) copolymers, and (iii) an internal layer comprising a polyamide. At least a portion of the intermediate layer is in contact with the external layer and/or the internal layer.

According to a third aspect, there is provided a method for producing a permeation barrier layer for a reinforced thermoplastic pipe for transportation of oilfield fluids. The method comprises (i) obtaining an external layer comprising a first thermoplastic polymer, (ii) obtaining an intermediate layer comprising ethylene vinyl alcohol (EVOH) copolymers, (iii) obtaining an internal layer comprising a polyamide, and (iv) placing said external layer, said intermediate layer and said internal layer together such that at least a portion of the intermediate layer is in contact with the external layer and/or the internal layer.

According to a fourth aspect, there is provided a method for producing a reinforced thermoplastic pipe body. The method comprises (i) obtaining a permeation barrier layer described according to the first aspect, (ii) obtaining at least one reinforcement layer comprising fibres or wires, and (iii) placing said permeation barrier layer and at least a portion of said reinforcement layer in contact with each other.

BRIEF DESCRIPTION OF THE DRAWINGS

The accompanying Figures, which are incorporated in and constitute a part of this specification, illustrate several aspects described below.

In the drawings like reference numerals refer to like parts.

DETAILED DESCRIPTION

Figure 1:
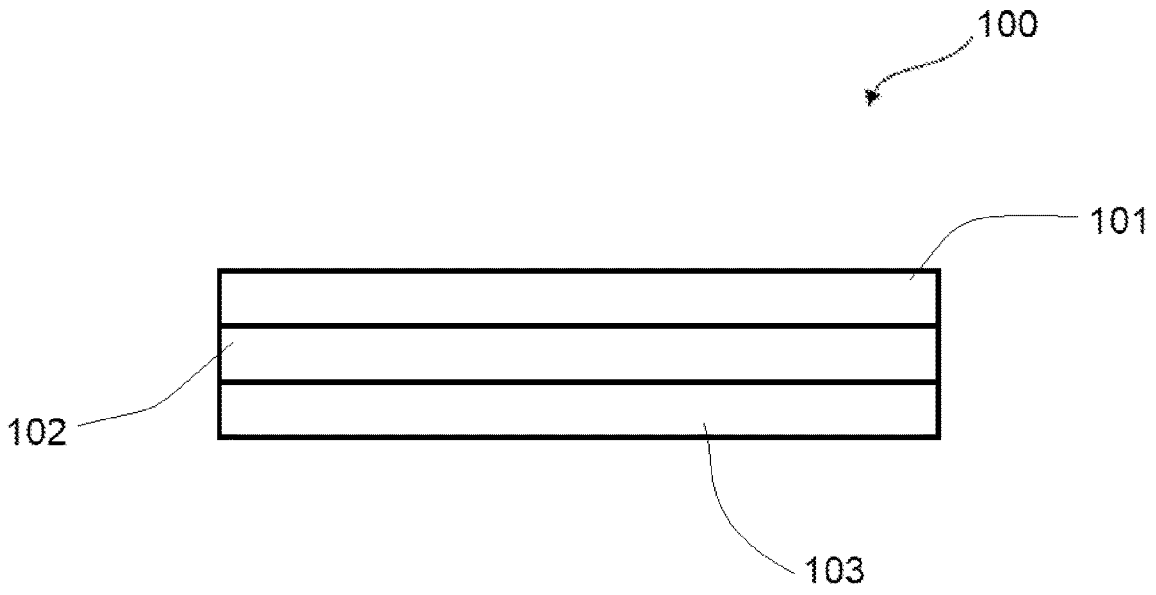
FIG. 1: illustrates a permeation barrier layer.

According to a first aspect, there is provided a permeation barrier layer for a reinforced thermoplastic pipe for transportation of oilfield fluids. The permeation barrier layer may be extruded. The permeation barrier layer may have a thickness of between about 2 mm to about 20 mm, preferably about 4 mm to about 15 mm. More preferably, the thickness of the permeation barrier layer is between about 5 mm to about 13 mm. The permeation barrier layer may comprise fewer than 5 layers. In a preferred embodiment, the permeation barrier layer consists of 3 layers.

The permeation barrier layer comprises an external layer comprising a first thermoplastic polymer. The external layer can have a thickness of between about 0.5 mm to about 12 mm. Preferably, the thickness of the external layer is between about 1 mm to about 11 mm, about 2 mm to about 10 mm, or about 4.5 mm to 9.5 mm. In a preferred embodiment, the thickness of the external layer is between about 10% to about 95% of the total thickness of the permeation barrier layer. For example, the thickness of the external layer can be between about 30% to about 90%, preferably about 50% to about 90%, more preferably between about 70% to 85% of the total thickness of the permeation barrier layer. In a preferred embodiment, the amount of first thermoplastic polymer in the external layer is between about 10 wt. % to about 90 wt. %. For example, the amount of first thermoplastic polymer in the external layer is between about 30 wt. % to about 80 wt. %, preferably about 50 wt. % to about 75 wt. %, more preferably about 65 wt. % to about 75 wt. %, or about 69 wt. % to about 73 wt. %.

The first thermoplastic polymer may comprise a polyamide. Preferably, the first thermoplastic polymer is selected from the group consisting of polyamide 6, polyamide 11, polyamide 12, polyamide 46, polyamide 66, polyamide 69, polyamide 610, polyamide 612, polyamide 1010, polyamide 1012, or polyamide 1212, polypropylene, PE, polyethylene-Raised Temperature, cross-linked polyethylene, and mixtures thereof. The thermoplastic polymer may include one or more additives to improve flexibility. In a preferred embodiment, the first thermoplastic polymer is selected from the group consisting of polyamide 6, polyamide 46, polyamide 66, polyamide 69, polyamide 610, polyamide 61, or a mixture thereof. More preferably, the first thermoplastic polymer comprises polyamide 6. The first thermoplastic polymer may consist essentially of polyamide 6. In some examples, the external layer consists essentially of polyamide 6.

In some examples, when the external layer comprises polyamide 12, the total amount of polyamide 12 present is about less than 15 wt. %, preferably about less than 10 wt. %, less than 5 wt. % or about less than 1 wt. %. Preferably, the external layer does not comprise polyamide 12.

The permeation barrier layer further comprises an intermediate layer comprising ethylene vinyl alcohol (EVOH) copolymers. The intermediate layer may have a thickness of between about 0.1 mm to about 3 mm. Preferably, the thickness of the intermediate layer is between about 0.2 mm to about 2 mm, about 0.3 mm to about 1.5 mm, or about 0.35 mm to about 1.35 mm. In some examples, the thickness of the intermediate layer is between about 0.7% to about 33% of the total thickness of the permeation barrier layer. Preferably, the thickness of the intermediate layer is between about 2% to about 30%, about 3% to about 25%, about 4% to about 20%, about 5% to about 15%, or about 6% to about 10% of the total thickness of the permeation barrier layer.

The total amount of ethylene vinyl alcohol (EVOH) copolymers present in the intermediate layer may be between about 0.5 wt. % to about 30 wt. %. Preferably, the total amount of ethylene vinyl alcohol (EVOH) copolymers present in the intermediate layer is between about 5 wt. % to about 35 wt. %, about 15 wt. % to about 20 wt. %, or about 17 wt. % to about 18 wt. %.

The permeation barrier layer further comprises an internal layer comprising a polyamide. The internal layer can have a thickness of between about 0.5 mm to about 12 mm. Preferably, the thickness of the internal layer is between about 0.5 to about 10 mm, about 0.75 mm to about 5 mm, about 0.75 mm to about 3 mm, or about 1 mm to about 2 mm. In a preferred embodiment, the thickness of the internal layer is between about 10% to about 95% of the total thickness of the permeation barrier layer. Preferably, the thickness of the internal layer is between about 10% to about 70%, about 12% to about 50%, about 13% to about 40%, about 14% to about 30% or about 15% to about 20% of the total thickness of the permeation barrier layer. In a preferred embodiment, the amount of polyamide in the internal layer is between about 10 wt. % to about 90 wt. %. Preferably, the amount of polyamide in the internal layer is between about 10 wt. % to about 50 wt. %, about 10 wt. % to about 30 wt. %, about 10 wt. % to about 15 wt. % or about 10 wt. % to about 14 wt. %. Preferably, the polyamide comprises one of polyamide 6, polyamide 46, polyamide 66, polyamide 69, polyamide 610, polyamide 61, or a mixture thereof. In some examples, the polyamide includes one or more additives to improve flexibility and/or improve adherence with EVOH. In a preferred embodiment, the first thermoplastic polymer comprises polyamide 6. In some examples, the first thermoplastic polymer consists essentially of polyamide 6.

In some examples, when the internal layer comprises polyamide 12, the total amount of polyamide 12 present is about less than 15 wt. %, preferably about less than 10 wt. %, less than 5 wt. % or about less than 1 wt. %. Preferably, the internal layer does not comprise polyamide 12.

According to the first aspect, at least a portion of the intermediate layer is in contact with the external layer and/or the internal layer. As used herein, at least a portion means at least about 40% to up to about 100% of the intermediate layer is in contact with the external layer and/or the internal layer. For example, at least 40%, at least 50%, at least 60%, at least 70%, at least 80%, at least 90%, at least 95% or 100% of the intermediate layer is in contact with the external layer and/or the internal layer.

As discussed herein, EVOH provides a significant improvement (i.e. reduction) in the permeability of the permeation barrier layer liner, and is used in multilayer structures to reduce its exposure to moisture. The present invention provides a permeation barrier layer comprising EVOH copolymers without the need for tie layers. In other words, multilayer structures with fewer than 5 layers (e.g. with 3 layers) can be produced for beneficial applications in reinforced thermoplastic pipes for transportation of oilfield fluids. In some examples, at least a portion of the intermediate layer is in contact with the external layer and the internal layer. In a preferred embodiment, the intermediate layer is bonded (e.g. chemically bonded) to the external layer and/or the internal layer.

Without being bound by any theory, it is believed that EVOH bonds to polar polymers such as polyamide. The polarity of polyamide is given by the amide groups. Therefore, the higher the density of amide groups, the higher the polarity of the polymer. It has advantageously been found that EVOH bonds to polar polymers (such as polyamide 6, polyamide 46, polyamide 66, polyamide 69, polyamide 610 and polyamide 61) without the need for tie layers. Particularly, EVOH bonds to polyamide 6 without the need of a tie layer. Thus, a permeation barrier layer with fewer than 5 layers (preferably consisting of 3 layers) can be produced. In a preferred embodiment, the EVOH copolymers are bonded (e.g. chemically bonded) to the first thermoplastic polymer and/or the internal layer polyamide.

In some examples, the first thermoplastic polymer and the internal layer comprise the same polyamide, such as a polyamide selected from the group consisting of polyamide 6, polyamide 46, polyamide 66, polyamide 69, polyamide 610 and polyamide 61, or mixtures thereof. In a preferred embodiment, the first thermoplastic polymer and the internal layer polyamide is the same. Preferably, the first thermoplastic polymer and the internal layer polyamide is polyamide 6. In some examples, the external layer and the internal layer are the same. In some embodiments, the external layer and the internal layer comprises polyamide 6. In some embodiments, the external layer and the internal layer consists essentially of polyamide 6.

As illustrated in FIG. 1, a permeation barrier layer (100) comprises an external layer (101) comprising a first thermoplastic polymer, an intermediate layer (102) comprising ethylene vinyl alcohol (EVOH) copolymers, and an internal layer (103) comprising a polyamide. At least a portion of the intermediate layer (102) is in contact with the external layer (101) and the internal layer (103).

According to a second aspect, there is provided a reinforced thermoplastic pipe body comprising a permeation barrier layer and at least one reinforcement layer comprising fibres or wires. The permeation barrier layer comprises (i) an external layer comprising a first thermoplastic polymer, (ii) an intermediate layer comprising ethylene vinyl alcohol (EVOH) copolymers, and (iii) an internal layer comprising a polyamide. At least a portion of the intermediate layer is in contact with the external layer and/or the internal layer. The permeation barrier layer may be the same as the permeation barrier layer described according to the first aspect.

The thickness of the permeation barrier layer can be between about 10% to about 75% of the total thickness of the reinforced thermoplastic pipe body wall. Preferably, the thickness of the permeation barrier layer is between about 20% to about 70%, about 30% to about 65%, or about 50% to about 60% of the total thickness of the reinforced thermoplastic pipe body wall.

In some examples, the permeation barrier layer may have a thickness of between about 2 mm to about 20 mm, preferably about 4 mm to about 15 mm. More preferably, the thickness of the permeation barrier layer is between about [5 mm to about 13 mm]. The permeation barrier layer may comprise fewer than 5 layers. In a preferred embodiment, the permeation barrier layer consists of 3 layers.

The reinforcement layer can be a reinforcement layer comprising helically wound tape and/or braided fibre strands, and may also comprise a second thermoplastic polymer. The reinforced thermoplastic pipe body may also comprise a protective layer comprising a further thermoplastic polymer. In some examples, the reinforced thermoplastic pipe body comprises the permeation barrier layer, the reinforcement layer and the protective layer. More preferably, the reinforced thermoplastic pipe body consists of the permeation barrier layer, the reinforcement layer and the protective layer.

The reinforcement layer may provide structural strength to the reinforced thermoplastic pipe body e.g. to withstand internal pressure and/or tension in the pipe when in use. The helically wound tape may comprise at least one polymer layer reinforced with filaments of any or a combination of glass, carbon, basalt, aramid, tensilized polyester or metal fibers or wires. In this case the reinforcements may be substantially aligned in the longitudinal direction of the tape and embedded within, or adhered to, or sandwiched between, the at least one polymer layer. A reinforcement tape may also comprise warp and weft fibers of similar or different materials or sizes so that the longitudinally aligned fibers/bundles/strands are bound or fixed in position with respect to one another in a woven fiber tape.

The braided fibre strands may be wound around the pipe in a helical manner, with lay angles optimized for pipe performance (the higher the angle the greater the pressure retainment capability, the lower the angle the greater the tension capability), or interwoven into a braid around the pipe. Layers of reinforcements may be applied sequentially at different angles to optimize and torsionally balance the structure during manufacture and during use.

The protective layer can provide protection for the reinforced thermoplastic pipe body e.g. against UV radiations and/or abrasion. The protective layer may be extruded. The protective sheath may be manufactured from high density polyethylene, HDPE, or optionally raised temperature grades of polyolefins.

In a preferred embodiment, the reinforced thermoplastic pipe body comprises the permeation barrier layer, the reinforcement layer and the protective layer. More preferably, the reinforced thermoplastic pipe body consists of the permeation barrier layer, the reinforcement layer and the protective layer.

Figure 2:
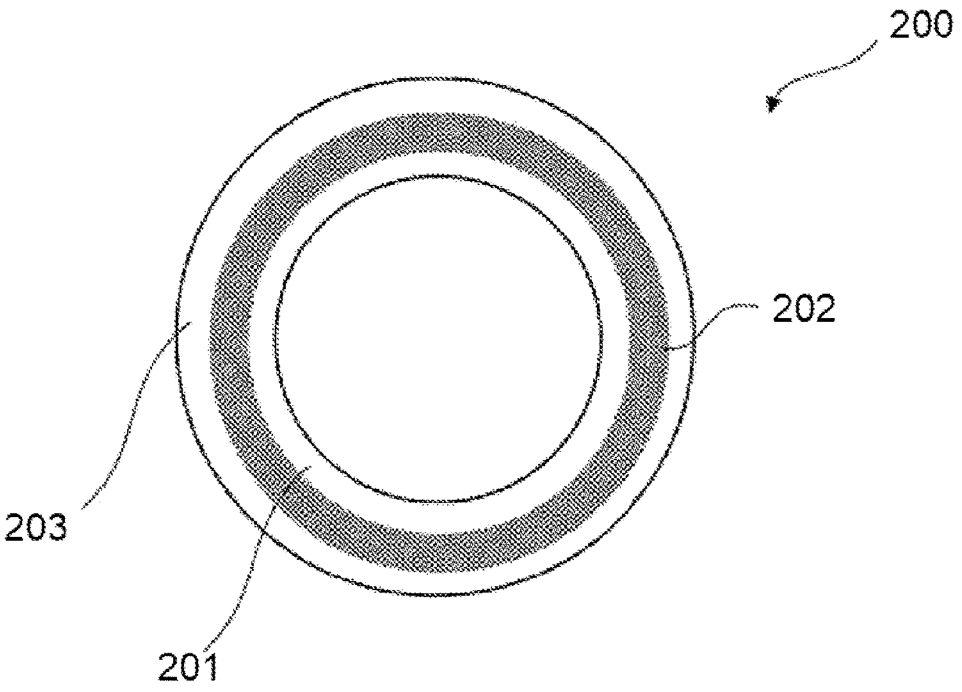
FIG. 2: illustrates a reinforced thermoplastic pipe body.

As illustrated in FIG. 2, a reinforced thermoplastic pipe body (200) comprises a permeation barrier layer (201), a reinforcement layer (202) located radially outwardly of the permeation barrier layer (201), and a protective layer (203) located radially outwardly of the reinforcement layer (202). The permeation barrier layer (201) can be the permeation barrier layer (100) as described in FIG. 1.

According to a third aspect, there is provided a method for producing a permeation barrier layer for a reinforced thermoplastic pipe for transportation of oilfield fluids. The method comprises (i) obtaining an external layer comprising a first thermoplastic polymer, (ii) obtaining an intermediate layer comprising ethylene vinyl alcohol (EVOH) copolymers, (iii) obtaining an internal layer comprising a polyamide, and (iv) placing said external layer, said intermediate layer and said internal layer together such that at least a portion of the intermediate layer is in contact with the external layer and/or the internal layer. The method can be used to produce a permeation barrier layer described according to the first aspect. In a preferred embodiment, the external layer, intermediate layer and internal layer are the same as the external layer, intermediate layer and internal layer as described according to the first aspect. The layers can be bonded by co-extruding the intermediate layer with the external layer and the internal layer. In some examples, the permeation barrier layer produced comprises fewer than 5 layers. In a preferred embodiment, the permeation barrier layer consists of 3 layers (i.e. the external layer, intermediate layer and internal layer).

According to a fourth aspect, there is provided a method for producing a reinforced thermoplastic pipe body. The method comprises (i) obtaining a permeation barrier layer described according to the first aspect, (ii) obtaining at least one reinforcement layer comprising fibres or wires, and (iii) placing said permeation barrier layer and at least a portion of said reinforcement layer in contact with each other. As used herein, at least a portion means at least about 40% to up to about 100% of the intermediate layer is in contact with the permeation barrier layer. For example, at least 40%, at least 50%, at least 60%, at least 70%, at least 80%, at least 90%, at least 95% or 100% of the intermediate layer is in contact with the permeation barrier layer.

The method can be used to produce a reinforced thermoplastic pipe body described according to the second aspect. In a preferred embodiment, the permeation barrier layer is also described according to the first aspect.

The reinforcement layer can be a reinforcement layer comprising helically wound tape and/or braided fibre strands, and may also comprise a second thermoplastic polymer. The method may further comprise obtaining a protective layer comprising a further thermoplastic polymer and placing said protective layer in contact with at least a portion of the reinforcement layer. In some examples, the reinforced thermoplastic pipe body comprises the permeation barrier layer, the reinforcement layer and the protective layer. More preferably, the reinforced thermoplastic pipe body consists of the permeation barrier layer, the reinforcement layer and the protective layer.

In some examples, the method comprises (i) obtaining a permeation barrier layer described according to the first aspect, (ii) obtaining at least one reinforcement layer comprising fibres or wires, and (iii) placing the reinforcement layer radially outwardly of the permeation barrier layer such that at least a portion of the reinforcement layer and permeation barrier layer are in contact with each other. In a preferred example, the method comprises locating a reinforcement layer comprising helically wound tape and/or braided fibre strands radially outwardly of a permeation barrier layer described according to the first aspect, and locating a protective layer comprising a further thermoplastic polymer radially outwardly of the reinforcement layer.

The reinforcement layer can be directly bonded to the permeation barrier layer. Bonding the reinforcement layer to the permeation barrier layer may comprise the step of applying energy, e.g. heat, and optionally also pressure, directly to the reinforcement layer and/or the permeation barrier layer.

It will be clear to a person skilled in the art that features described in relation to any of the embodiments described above can be applicable interchangeably between the different embodiments. The embodiments described above are examples to illustrate various features of the invention.

The reader's attention is directed to all papers and documents which are filed concurrently with or previous to this specification in connection with this application and which are open to public inspection with this specification, and the contents of all such papers and documents are incorporated herein by reference.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

EXAMPLES

Example 1—Permeation Barrier Layer

Co-extrusion technology can be used to integrate EVOH copolymers into a multi-layer structure. For example, a 3-layer co-extruded sheet can be formed using 3 separate extruders that feed a common die. In this configuration, EVOH should be extruded in the intermediate layer, and the internal and/or external layer should be extruded with polyamide 6 to ensure a suitable bonding with EVOH.

In an example, a co-extruded sample sheet can be formed consisting of a 0.5 mm thick internal layer comprising polyamide 6, a 0.1 mm thick intermediate layer comprising EVOH copolymers and a 0.5 mm thick external layer comprising polyamide 6. Small-scale gas permeation tests can be conducted to confirm and quantify the impact of EVOH in the permeability of the permeation barrier layer. Small-scale rapid gas decompression tests can assess the blistering resistance of the permeation barrier layer once exposed to hydrogen.

Full-scale tests could be performed to further confirm the performance e.g. higher resistance and lower permeability) of the permeation barrier layer. For example, short-term burst tests, elevated temperature tests and/or gas permeation tests.

The invention claimed is:

1. A reinforced thermoplastic pipe body for transportation of oilfield fluids comprising a permeation barrier layer and at least one reinforcement layer comprising fibres or wires, wherein the permeation barrier layer comprises:

i. an external layer comprising a first thermoplastic polymer, wherein the first thermoplastic polymer comprises a polyamide, ii. an intermediate layer comprising ethylene vinyl alcohol (EVOH) copolymers, and iii. an internal layer comprising a polyamide, wherein at least a portion of said intermediate layer is in contact with the external layer and/or the internal layer, and the external layer and/or the internal layer independently have a thickness of between about 0.5 mm to about 12 mm.

2. The reinforced thermoplastic pipe body according to claim 1, wherein the thickness of said permeation barrier layer is between about 10% to about 75% of the total thickness of the reinforced thermoplastic pipe body wall.

3. The reinforced thermoplastic pipe body according to claim 1, wherein the reinforcement layer is a reinforcement layer comprising helically wound tape and/or braided fibre strands, optionally comprising a second thermoplastic polymer.

4. The reinforced thermoplastic pipe body according to claim 1, wherein said reinforced thermoplastic pipe body consists of the permeation barrier layer, the at least one reinforcement layer reinforcement layer, and a protective layer comprising a further thermoplastic polymer.

5. A method for producing a reinforced thermoplastic pipe body for transportation of oilfield fluids according to claim 1, said method comprising:

i. obtaining a permeation barrier layer, ii. obtaining at least one reinforcement layer comprising fibres or wires, and iii. placing said permeation barrier layer and at least a portion of said reinforcement layer in contact with each other, wherein the permeation barrier layer is obtained by the method comprising:

a. obtaining an external layer comprising a first thermoplastic polymer, the first thermoplastic polymer comprises a polyamide, b. obtaining an intermediate layer comprising ethylene vinyl alcohol (EVOH) copolymers, c. obtaining an internal layer comprising a polyamide, and d. placing said external layer, said intermediate layer and said internal layer together such that at least a portion of the intermediate layer is in contact with the external layer and/or the internal layer.

6. The method according to claim 5, wherein said external layer, said intermediate layer and said internal layer are bonded by co-extrusion.

7. The reinforced thermoplastic pipe body according to claim 1, wherein the intermediate layer has a thickness of between about 0.1 mm to about 3 mm.

* * * * *